US011326047B2

(12) United States Patent
Kim et al.

(10) Patent No.: US 11,326,047 B2
(45) Date of Patent: May 10, 2022

(54) METHOD OF PREPARING THERMOPLASTIC RESIN

(71) Applicant: LG CHEM, LTD., Seoul (KR)

(72) Inventors: In Soo Kim, Daejeon (KR); Hyung Sub Lee, Daejeon (KR); Min Cheol Ju, Daejeon (KR); Min Seung Shin, Daejeon (KR); Sung Won Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 400 days.

(21) Appl. No.: 16/325,156

(22) PCT Filed: Oct. 31, 2017

(86) PCT No.: PCT/KR2017/012161
§ 371 (c)(1),
(2) Date: Feb. 12, 2019

(87) PCT Pub. No.: WO2018/110825
PCT Pub. Date: Jun. 21, 2018

(65) Prior Publication Data
US 2019/0225788 A1  Jul. 25, 2019

(30) Foreign Application Priority Data
Dec. 13, 2016 (KR) .................... 10-2016-0169127

(51) Int. Cl.
| | | |
|---|---|---|
| *C08F 297/04* | (2006.01) | |
| *C08F 6/22* | (2006.01) | |
| *C08J 3/12* | (2006.01) | |
| *C08L 25/12* | (2006.01) | |
| *C08L 55/02* | (2006.01) | |
| *C08C 1/15* | (2006.01) | |
| *C08J 3/00* | (2006.01) | |
| *C08J 3/16* | (2006.01) | |
| *C08L 35/04* | (2006.01) | |
| *C08L 9/04* | (2006.01) | |
| *B29B 9/06* | (2006.01) | |
| *B29K 55/02* | (2006.01) | |

(52) U.S. Cl.
CPC ............ *C08L 25/12* (2013.01); *C08F 6/22* (2013.01); *C08F 297/04* (2013.01); *C08J 3/16* (2013.01); *C08L 35/04* (2013.01); *C08L 55/02* (2013.01); *B29B 9/06* (2013.01); *B29K 2055/02* (2013.01); *C08L 9/04* (2013.01)

(58) Field of Classification Search
CPC ...... C08C 1/14; C08C 1/15; C08J 3/12; C08J 3/16
See application file for complete search history.

(56) References Cited

U.S. PATENT DOCUMENTS

| 5,698,666 A | 12/1997 | Burroway et al. |
| 2007/0060710 A1 | 3/2007 | Jeong et al. |

FOREIGN PATENT DOCUMENTS

| CN | 101044193 A | 9/2007 |
| CN | 101429266 A | 5/2009 |
| CN | 106065037 A | 11/2016 |
| CN | 106103549 A | 11/2016 |
| JP | 60-106835 | 6/1985 |
| JP | 1995-173217 | 7/1995 |
| JP | 07188329 A | 7/1995 |
| JP | H07188329 A | 7/1995 |
| JP | 2000007728 A | 1/2000 |
| JP | 3455572 B2 | 10/2003 |
| KR | 10-0455101 | 11/2004 |
| KR | 20080058661 A | 6/2008 |
| KR | 20090038510 A | 4/2009 |
| KR | 10-1042443 | 6/2011 |
| KR | 1146072 | 5/2012 |
| KR | 2014-0146783 | 12/2014 |
| KR | 10-1528387 | 6/2015 |
| KR | 20160028357 A | 3/2016 |
| KR | 20180051839 A | 5/2018 |

OTHER PUBLICATIONS

Machine translation of JP07188329 (Year: 2021).*
Karimi, L. et al. J. Chem. Eng. Process Technol. vol. 6 issue 2 (Year: 2015).*
International Search Report & Written Opinion; PCT/KR2017/012161; dated Jul. 20, 2018; 27 pages.
Notification of First Office Action for KR 201780044133.0; dated Aug. 18, 2020; 10 pages.
EN Machine translation of JP3455572; 9 pages.
EN Abstract of CN 106103549; 3 pages.
EN Abstract of CN 106065037; 2 pages.
EN Machine translation of JP60-106835; 7 pages.
EN Abstract for CN101044193; 3 pages.
EN Abstract for CN10429266; 3 pages.
European Search Report issued in related application No. EP 17880046.2 dated Jul. 23, 2019.

(Continued)

*Primary Examiner* — Irina S Zemel
*Assistant Examiner* — Jeffrey S Lenihan
(74) *Attorney, Agent, or Firm* — Morgan, Lewis & Bockius LLP

(57) ABSTRACT

The present invention relates to a method of preparing a thermoplastic resin. More particularly, the present invention relates to a method of preparing a thermoplastic resin, the method including A) a step of coagulating an emulsion-polymerized latex with an acid; B) a step of treating the coagulated aggregate (slurry) with a base, followed by dehydration; and C) a step of treating the dehydrated wet powder with an acid, followed by dehydration. A method of preparing a thermoplastic resin which exhibits reduced gas generation, color improvement, and superior thermal stability is provided.

16 Claims, 1 Drawing Sheet

(56) References Cited

OTHER PUBLICATIONS

Decision of Registration dated Sep. 7, 2020 of Priority KR 10-2016-0169127; 2 pages.
EN abstract of JP 1995-173217A Kaneka Corp.; 1 page.
EN abstract of KR 2014-0146783A LG Chem, Ltd; 1 page.

\* cited by examiner

METHOD OF PREPARING THERMOPLASTIC RESIN

CROSS-REFERENCE TO RELATED APPLICATION

The application present specification is a U.S. National Stage of International Patent Application No. PCT/KR2017/012161 filed Oct. 31, 2017, which claims priority to and the benefit of Korean Patent Application No. 10-2016-0169127 filed in the Korean Intellectual Property Office on Dec. 13, 2016, the entire contents of which are incorporated herein by reference.

TECHNICAL FIELD

The present invention relates to a method of preparing a thermoplastic resin. More particularly, the present invention relates to a method of preparing a thermoplastic resin exhibiting reduced gas generation, color improvement, and superior thermal stability.

BACKGROUND ART

A production process of a dried ABS resin powder is generally carried out using emulsion-polymerized latex and a coagulant. Here, an acid or salt coagulant is generally used. When an acid coagulant is used, problems such as gas generation and color degradation may occur compared to when a salt coagulant is used.

To compensate for such problems, an aggregate, which has been subjected to coagulation and aging processes, may be treated with a base to remove a residual emulsifier therefrom. Accordingly, gas generation may be reduced and color improvement may be accomplished. However, thermal stability may be decreased. Such decreased thermal stability may cause problems during a drying process of an ABS resin, and the ABS resin is easily carbonized, whereby the quality of a final product may be adversely affected.

Therefore, there is an urgent need for a method of preparing a thermoplastic resin capable of preventing thermal stability decrease while exhibiting reduced gas generation and color improvement effect.

RELATED ART DOCUMENT

[Patent Document] KR Patent No. 1146072 B1

DISCLOSURE

Technical Problem

Therefore, the present invention has been made in view of the above problems, and it is one object of the present invention to provide a method of preparing a thermoplastic resin exhibiting reduced gas generation, color improvement, and superior thermal stability.

The above and other objects can be accomplished by the present disclosure described below.

Technical Solution

In accordance with one aspect of the present invention, provided is a method of preparing a thermoplastic resin, the method including A) a step of coagulating an emulsion-polymerized latex with an acid; B) a step of treating the coagulated aggregate (slurry) with a base, followed by dehydration; and C) a step of treating the dehydrated wet powder with an acid, followed by dehydration.

The emulsion-polymerized latex may be, for example, a vinyl cyanide compound-conjugated diene-aromatic vinyl compound copolymer latex.

In the step of coagulating an emulsion-polymerized latex with an acid, for example, sulfuric acid may be used as a coagulant.

In the step of treating the coagulated aggregate (slurry) with a base, the base may be, for example, added to and then mixed with the coagulated aggregate.

The base may be, for example, sodium hydroxide.

In step C) of treating the dehydrated wet powder with an acid, for example, water and an acid, water and an aqueous acid solution, or an aqueous acid solution may be added and then mixed.

Between steps A) and B), for example, a step of aging the coagulated aggregate (slurry) may be further included.

In the step of the aging, the aggregate may be, for example, aged at 85 to 95° C. or 90 to 95° C. for 5 minutes to 20 minutes or 5 minutes to 10 minutes. In another embodiment, step C) of treating the dehydrated wet powder with an acid may be performed by adding water to the dehydrated wet powder, mixing the same, adding an aqueous acid solution thereto, and mixing the same.

The wet powder, which is acid-treated and then dehydrated according to step C), may have a pH of, for example, 5.5 to 7.5, 6 to 7, or 6.0 to 7.0.

A residual emulsifier in the wet powder, which is acid-treated and then dehydrated according to step C), may be, for example, 7,000 ppm or less, 6,000 ppm or less, 5,000 ppm or less, 3,000 ppm or less, or 3,000 to 1,800 ppm.

The wet powder, which is acid-treated and then dehydrated according to step C), may have an oxidative induction time (OIT) of, for example, 15 minutes or more, 17 minutes or more, 15 to 20 minutes, or 17 to 20 minutes.

The thermoplastic resin may have a gloss of, for example, 98 or more, 99 or more, 99.5 or more, 98 to 100, or 99 to 100, measured at 45° using a glossmeter.

The thermoplastic resin may have a whiteness (WI) of, for example, 45 or more, 46 or more, 46.5 or more, or 46.5 to 48, as measured using a colorimeter (Color Quest II, Hunter Lab Co.).

The thermoplastic resin has a b value of 5 or less, 4 or less, 3.9 or less, 3 or more, or 3.9 to 3.0, as measured using a colorimeter (Color Quest II, Hunter Lab Co.).

The thermoplastic resin may have an impact strength (¼") of, for example, 27 kg·cm/cm or more, 27.0 kg·cm/cm or more, 27.7 kg·cm/cm or more, or 27.7 to 30 kg·cm/cm, as measured according to ASTM D256.

The thermoplastic resin may have a scorch time of, for example, 40 minutes or more, 60 minutes or more, or 70 minutes or more, as a time taken until a carbide from a sample is detected in a 200° C. oven.

In accordance with another aspect of the present invention, provided is a method of preparing a thermoplastic resin composition, the method including a step of mixing 10 to 60% by weight of an ABS-based resin powder prepared according to the method of preparing a thermoplastic resin of the present invention and 40 to 90% by weight of an aromatic vinyl compound-vinyl cyanide compound copolymer, and extruding a resultant mixture.

Advantageous Effects

As apparent from the fore-going, the present invention advantageously provides a method of preparing a thermoplastic resin capable of exhibiting reduced gas generation, color improvement, and superior thermal stability.

DESCRIPTION OF DRAWINGS

The FIGURE is a table illustrating scorch test results of dried thermoplastic resin powders of Examples 1 to 6 wherein an acid treatment degree (pH) is varied.

BEST MODE

Hereinafter, a method of preparing a thermoplastic resin of the present disclosure is described in detail.

The present inventors confirmed that, when an acid is added to a wet dehydrated ABS resin powder, which has been treated with a base, and sufficient stirring is performed so as to remove a residual emulsifier, after a coagulation/aging process, an emulsifier remaining in an ion form is replaced by an acid-bonded form, and remaining water-soluble salt (salt) and ions are completely removed by a subsequent dehydration process, whereby gas generation is reduced, color is improved, and thermal stability, which has been cut in half, is restored to an original level thereof. Based on these findings, the present inventors have made further studies, thus completing the present invention.

The method of preparing a thermoplastic resin of the present invention includes A) a step of coagulating an emulsion-polymerized latex with an acid; B) a step of treating the coagulated aggregate (slurry) with a base, followed by dehydration; and C) a step of treating the dehydrated wet powder with an acid, followed by dehydration.

The emulsion-polymerized latex may be, for example, a vinyl cyanide compound-conjugated diene-aromatic vinyl compound copolymer latex (hereinafter referred to as "ABS-based resin latex").

The ABS-based resin latex may be prepared by, for example, emulsion-polymerizing 100 parts by weight of a monomer mixture including 40 to 70% by weight of a rubber polymer (based on solid), 15 to 35% by weight of an aromatic vinyl compound, and 5 to 25% by weight of a vinyl cyanide compound; 0.01 to 5 parts by weight of an emulsifier; and 0.001 to 3 parts by weight of an initiator.

Other additives, such as water for polymerization and an electrolyte, and polymerization conditions, such as reaction temperature and reaction time, which are not specifically enumerated in the present disclosure, may be suitably selected as needed, and are not specifically limited so long as they have been generally used to prepare an ABS-based resin latex.

In the present invention, the rubber polymer may be a conjugated diene-based compound polymer. As a particular example, the rubber polymer may be one or more selected from the group including a butadiene polymer, a butadiene-styrene copolymer, a butadiene-acrylonitrile copolymer, an ethylene-propylene copolymer, and the like, but the present invention is not limited thereto.

In the present invention, the aromatic vinyl compound may be one or more selected from the group including styrene, α-methyl styrene, p-methyl styrene, and the like, but the present invention is not limited thereto.

In the present invention, the vinyl cyanide compound may be one or more selected from the group including acrylonitrile, methacrylonitrile, ethacrylonitrile, and the like, but the present invention is not limited thereto.

In the present invention, the emulsifier may be, for example, one or more selected from the group including alkylaryl sulfonate, alkali methyl alkyl sulfate, sulfonated alkyl ester salt, alkyl(alkenyl) carboxylic acid salt, alkyl (alkenyl) succinate, fatty acid salt, rosinate, oleate, and the like, but the present invention is not limited thereto.

The step A) of coagulating an emulsion-polymerized latex with an acid of the present invention may be a step of adding an acid coagulant to an ABS-based resin latex prepared through emulsion polymerization to coagulate the ABS-based resin latex. Here, based on 100 parts by weight of the ABS-based resin latex or 45 parts by weight of a solid thereof, the acid coagulant may be preferably added in an amount of 0.5 to 4 parts by weight, 0.5 to 3 parts by weight, 0.7 to 2.5 parts by weight, or 1.5 to 2.2 parts by weight. Within this range, surface characteristics, such as gloss and whiteness, are superior.

The step A) of coagulating an emulsion-polymerized latex with an acid may be carried out, for example, at 60 to 90° C., preferably 75 to 85° C., more preferably 70 to 80° C. Within this temperature range, a coagulation degree is high and productivity is superior.

In addition, the step A) of coagulating an emulsion-polymerized latex with an acid may be carried out, for example, at a stirring rate of 150 to 400 rpm, 250 to 350 rpm, or 300 to 350 rpm for 5 to 20 minutes or 10 to 15 minutes, but the present invention is not limited thereto. Within this range, productivity is superior, a coagulation degree is high, and property balance is superior.

In the step A) of coagulating an emulsion-polymerized latex with an acid, the added acid coagulant may be, for example, one or more selected from the group consisting of sulfuric acid, hydrochloric acid, nitric acid, phosphoric acid, formic acid and acetic acid. The added acid coagulant is preferably sulfuric acid. When these substances are used, a coagulation degree is high and productivity is superior.

In the step A) of coagulating an emulsion-polymerized latex with an acid, water and the acid coagulant may be added as a mixture or individually. Preferably, the acid coagulant and water are mixed to be added in an aqueous acid solution form.

The aqueous acid solution may be, for example a 0.01 to 1 M (molar concentration) aqueous solution, preferably a 0.03 to 0.8 M (molar concentration) or 0.1 to 0.7 M (molar concentration) aqueous solution. In addition, when the acid and water are respectively added, water is preferably added in such an amount that the concentration of the acid coagulant is 0.01 to 1 M (molar concentration). Within this range, coagulation degree and productivity are high, and thermal stability is superior.

In another embodiment, an acid concentration of the aqueous acid solution may be 0.1 to 10% by weight, 1 to 6% by weight, 1 to 5% by weight, or 4 to 5% by weight. Within this range, coagulation degree is high, and thus, productivity of an ABS-based resin powder is superior.

In the step A) of coagulating an emulsion-polymerized latex with an acid, the pH of an aggregate (slurry) may be adjusted to 1 to 4.5, 1.5 to 4, or 2.5 to 4. Within this range, a coagulation degree is high, and thus, productivity of an ABS-based resin powder is superior.

The method of preparing a thermoplastic resin may further include, for example, an aging step, after the coagulation step.

As a more particular example, the present invention may further include, before treating the aggregate, which has been coagulated with an acid, with a base, an aging step of aging the aggregate at 85 to 95° C. or 90 to 95° C. In this case, productivity of a resin powder is increased, and surface characteristics, such as gloss and whiteness, heat resistance, mechanical strength, and the like are superior.

The aging step may be carried out, for example, at 0.1 MPa or more, 0.15 MPa or more, 0.15 to 0.3 MPa, 0.15 to 0.25 MPa, or 0.22 to 0.25 MPa. Within this range, a moisture content in a powder is reduced.

The aging step may be carried out, for example, for 5 minutes or more, 10 minutes or more, 5 minutes to 30 minutes, 5 minutes to 20 minutes, or 10 minutes to 20 minutes. Within this range, moisture content is reduced, thereby increasing productivity. In addition, since a particle size increases, fine particles may be prevented from being blown away upon compounding and handling of a sample.

In the aging step, a stirring rate may be, for example, 100 to 400 rpm, 150 to 350 rpm, or 200 to 300 rpm. Within this range, since particles are reassembled and the size thereof increases, a thermoplastic resin has superior heat resistance, whiteness, impact strength, and the like.

The step B) of treating the coagulated aggregate with a base includes, for example, a process of adding a base to the aggregate (slurry) and adjusting pH to 8 to 12. The pH is adjusted to preferably 9.5 to 11.5, more preferably 10 to 11. Within this range, the content of a residual emulsifier is reduced, a gas generation amount is reduced during thermoforming due to exclusion of a remaining acid, and surface characteristics, such as gloss, yellowness, and whiteness, are superior.

The step B) of treating the coagulated aggregate with a base may be carried out, for example, at 0 to 100° C., preferably 30 to 90° C., more preferably 50 to 90° C., or 70 to 80° C. Within this range, the content of a residual emulsifier is more effectively reduced, and surface characteristics, such as gloss and whiteness, are superior.

In addition, the step B) of treating the coagulated aggregate with a base may be carried out, for example, at a stirring rate of 10 to 500 rpm or 300 to 500 rpm for 1 to 60 minutes or 30 to 60 minutes. Within this range, productivity is superior, variation in physical properties is small because side reaction is prevented, and a resin having superior mechanical strength, heat resistance, surface characteristics, and the like may be produced.

In the step B) of treating the coagulated aggregate with a base, the added base may be, for example, one or more selected from the group consisting of sodium hydroxide, potassium hydroxide, ammonium hydroxide, sodium carbonate, and sodium hydrogen carbonate. The base is preferably sodium hydroxide.

In the step B) of treating the coagulated aggregate with a base, water and the base may be added as a mixture, or may be individually added. Preferably, the base and water are mixed to be added as an aqueous base solution.

The aqueous base solution may be, for example, a 0.01 to 5 M (molar concentration) aqueous solution, preferably a 0.5 to 4 M (molar concentration) or 2 to 4 M (molar concentration) aqueous solution. In addition, when the base and water are respectively added, water is preferably added in such an amount that the concentration of the base is within the aqueous base solution concentration range. Within this range, the content of a residual emulsifier is reduced and, due to exclusion of a remaining acid, surface characteristics, such as surface gloss and whiteness, are superior.

In another embodiment, a base concentration in the aqueous base solution may be 1 to 20% by weight, 5 to 15% by weight, or 8 to 12% by weight. Within this range, the content of a residual emulsifier is reduced, and due to exclusion of remaining acid, surface characteristics, such as surface gloss and whiteness, are superior.

The aqueous base solution may be included in an amount of, for example, 0.5 to 5 parts by weight, 0.5 to 3 parts by weight, or 1 to 2 parts by weight based on 100 parts by weight of the ABS-based resin latex or 45 parts by weight of a solid thereof. Within this range, removal of a residual emulsifier and dehydration may be easily accomplished.

In another embodiment, the step B) of treating the coagulated aggregate with a base may be a step of adding an aqueous base solution to the aggregate (slurry) to adjust pH to 8 to 12, or 9.5 to 11.5, and then adding water, in an amount of 0.5 to 1.5 times, 0.9 to 1.5 times, or 1 times the amount (volume) of the aqueous base solution, to the aqueous base solution. Within this range, removal of a residual emulsifier and dehydration may be easily accomplished.

In step B), the dehydration is not specifically limited so long as it is a method generally performed in the technical field to which the present invention pertains. For example, the aggregate treated with the base may be dehydrated by means of a centrifugal dehydrator, a squeezing type dehydrator, or the like.

In step C) of treating the dehydrated wet powder with an acid, for example, water and an acid, water and an aqueous acid solution, or an aqueous acid solution may be added and then mixed.

In step C), the concentration of an acid in the aqueous acid solution may be, for example, 0.1 to 10% by weight, 1 to 6% by weight, 1 to 5% by weight, or 4 to 5% by weight. When the acid and water are respectively added, water may be added in such an amount that the concentration of the acid is within the range. Within this range, the content of a residual emulsifier is low, and thermal stability, color, and the like are superior.

In step C), the aqueous acid solution may be added in an amount of, for example, 0.1 to 1 parts by weight, preferably 0.2 to 0.6 parts by weight, more preferably 0.3 to 0.4 parts by weight, based on 100 parts by weight of the emulsion-polymerized latex or 45 parts by weight of a solid thereof. Within this range, the content of a residual emulsifier is low, and thermal stability, color, and the like are superior.

In another embodiment, the step C) of treating the dehydrated wet powder with an acid may be a step of adding 5 to 20 parts by weight, 5 to 15 parts by weight, or 8 to 13 parts by weight of water based on 100 parts by weight of a solid of the wet powder, mixing the same, and adding 0.1 to 2% by weight, 0.2 to 1% by weight, or 0.3 to 0.6% by weight, which is within the aforementioned concentration range, of the aqueous acid solution thereto based on 100 parts by weight of the emulsion-polymerized latex or 45 parts by weight of a solid thereof.

In another embodiment, the step C) of treating the dehydrated wet powder with an acid may be a step of adding 5 to 20 parts by weight, 5 to 15 parts by weight, or 8 to 13 parts by weight of water based on 100 parts by weight of a solid of the wet powder, mixing the same, adding 0.1 to 2% by weight, 0.2 to 1% by weight, or 0.3 to 0.6% by weight, which is within the aforementioned concentration range, of the aqueous acid solution thereto based on 100 parts by weight of the emulsion-polymerized latex or 45 parts by weight of a solid thereof to lower pH, and adding 5 to 20 parts by weight, 5 to 15 parts by weight or 8 to 13 parts by weight of water thereto based on 100 parts by weight of a solid of the wet powder again.

In the step C) of treating the dehydrated wet powder with an acid, the acid-treated slurry (wet powder+water+acid) may have a pH of, for example 1.5 to 9.5, 1.86 to 9.12, 2 to 8, 2 to 6, or 2 to 4, preferably 2.5 to 3.5, most preferably 2.8 to 3.2. Within this range, the content of a residual emulsifier is low, and thermal stability, color, and the like are superior.

In step C), the dehydration is not specifically limited so long as it is a method generally performed in the technical field to which the present invention pertains. For example, the acid-treated aggregate may be dehydrated by means of a centrifugal dehydrator, a squeezing type dehydrator, or the like.

During the dehydration in step C), water may be added in an amount of, for example, 5 to 20 parts by weight, 5 to 15 parts by weight or 8 to 13 parts by weight based on 100 parts by weight of a solid of the wet powder.

The wet powder, which is acid-treated and then dehydrated according to step C), may have a pH of, for example, 3 to 9, 4 to 8, 5 to 7, or 6 to 6.5.

The method of preparing a thermoplastic resin of the present disclosure may further include, for example, a step D) of drying the wet powder that has been treated with an acid and dehydrated.

The powder (dry powder) dried according to step D) may have a pH of, for example, 3 to 9, 4 to 8, 5 to 7, or 6 to 6.5.

The drying is not specifically limited so long as it is a process generally performed and known in the technical field to which the present invention pertains. For example, the dehydrated resin powder may be dried by supplying air thereto using a fluid bed dryer.

A moisture content in the resin powder obtained by drying the powder-type wet resin may be, for example, 1% by weight or less, preferably 0.1 to 0.5% by weight. Within this range, productivity of a resin is superior, and properties, such as mechanical strength, heat resistance, and surface gloss, are superior.

A residual emulsifier in the wet powder, which is acid-treated and then dehydrated according to step C) may be, for example, 6,000 ppm or less, 5,000 ppm or less, 3,000 ppm or less, or 3,000 to 1,800 ppm.

The wet powder, which is acid-treated and then dehydrated according to step C), may have, for example, an oxidative induction time (OIT) of 15 minutes or more, 17 minutes or more, 15 to 20 minutes, or 17 to 20 minutes.

The thermoplastic resin may have a gloss of, for example, 99 or more, 99.1 or more, 99.5 or more, 98 to 101, or 98 to 100, measured at 45° using a glossmeter.

The thermoplastic resin may have a whiteness (WI) of, for example, 45 or more, 46 or more, 46.5 or more, or 46.5 to 48 or more, as measured using a colorimeter (Color Quest II, Hunter Lab Co.).

The thermoplastic resin may have a b value of, for example, 5 or less, 4 or less, 3.9 or less, or 3.9 to 3.0, as measured using a colorimeter (Color Quest II, Hunter Lab Co.).

The thermoplastic resin may have an impact strength (¼") of, for example, 27 kg·cm/cm or more, 27.0 kg·cm/cm or more, 27.7 kg·cm/cm or more, or 27.7 to 30 kg·cm/cm, as measured according to ASTM D256.

In another embodiment, the thermoplastic resin may have, an impact strength (¼") of 13 to 28 kg·cm/cm, 16 to 28 kg·cm/cm, or 27 to 28 kg·cm/cm, as measured according to ASTM D256.

The thermoplastic resin has a scorch time of, for example, 40 minutes or more, 50 minutes or more, 60 minutes or more, 65 minutes or more, or 70 minutes or more, as a time taken until a carbide from a sample is detected in a 200° C. oven. Within this range, the thermoplastic resin stands heat longer.

A remaining acid content in the thermoplastic resin may be, for example, 0 ppm. In this case, due to a reduced gas generation amount, weight loss by heating is low and gloss increases.

The thermoplastic resin may have a heat distortion temperature (HDT) of, for example, 83° C. or more, 84° C. or more, 83 to 85° C., or 83.5 to 84.5° C. Within this range, heat resistance and property balance are superior.

A weight loss by isothermal heating of the thermoplastic resin may be, for example, 1.0% by weight or less, 0.8% by weight or less, or 0.6% by weight or less.

A moisture content in the wet powder-type resin dehydrated according to step C) may be, for example, 40% by weight or less, 10 to 40% by weight, 10 to 35% by weight or 10 to 30% by weight. In this case, efficiency of a subsequent drying step increases, thereby providing superior productivity.

It should be noted that, with regard to the method of preparing a thermoplastic resin of the present invention described above, other conditions, which are not explicitly disclosed, are not specifically limited so long as they are generally performed in the technical field to which the present invention pertains and may be appropriately selected and performed.

The ABS-based resin powder prepared according to the method of the present invention may be mixed with an aromatic vinyl compound-vinyl cyanide compound copolymer to prepare an ABS-based resin composition. Hereinafter, a method of preparing the ABS-based resin composition according to the present disclosure is described in detail.

The method of preparing the thermoplastic resin composition includes a step of mixing 10 to 60% by weight of an ABS-based resin powder prepared according to the method and 40 to 90% by weight of an aromatic vinyl compound-vinyl cyanide compound copolymer and extruding a resultant mixture.

In another embodiment, the method of preparing the ABS-based resin composition of the present invention may include a step of kneading and extruding 20 to 50% by weight of the ABS-based resin powder and 50 to 80% by weight of the aromatic vinyl compound-vinyl cyanide compound copolymer.

When the content of the aromatic vinyl compound-vinyl cyanide compound copolymer is within this range, heat resistance, processability, and the like are superior.

The aromatic vinyl compound-vinyl cyanide compound copolymer may be, for example, a copolymer including 50 to 90% by weight of an aromatic vinyl compound and 10 to 50% by weight of a vinyl cyanide compound. In another embodiment, the aromatic vinyl compound-vinyl cyanide compound copolymer may be a copolymer including 60 to 80% by weight of an aromatic vinyl compound and 20 to 40% by weight of a vinyl cyanide compound. Within this range, mechanical properties, such as impact strength, are superior, and surface characteristics, such as whiteness and gloss, are superior.

As the aromatic vinyl compound and the vinyl cyanide compound, for example, one or more aromatic vinyl compounds and vinyl cyanide compounds used to prepare an ABS-based resin latex may be used. Preferably, the aromatic vinyl compound may be styrene, and the vinyl cyanide compound may be acrylonitrile.

In addition, the ABS-based resin composition may further, selectively include one or more additives selected from a lubricant, an antioxidant, a heat stabilizer, and a light stabilizer, as needed.

The kneading and extruding step is not specifically limited, and may be, for example, a step of uniformly dispersing the composition by means of a single-screw extruder, a twin-screw extruder, a Banbury mixer, or the like. The composition is uniformly kneaded, and then extruded, thereby being prepared in pellet form.

The kneading and extruding step may be performed, for example, under conditions of 150 to 300° C. and 100 to 500 rpm, or under conditions of 200 to 300° C. and 200 to 300 rpm, but the present invention is not limited thereto.

The ABS-based resin composition prepared according to the method of the present invention is characterized by having a gloss of 99 or more, 100 or more, 101 or more, or 98 to 100, a whiteness of 47 or more, or 47.5 or more, and a yellowness of 4 or less, or 3.8 or less.

In addition, the ABS-based resin composition has an appropriate flow index (220° C., under a load of 10 kg) of 5 to 35 g/10 min, 10 to 30 g/10 min or 20 to 30 g/10 min, thus having superior moldability. In addition, the ABS-based resin composition has an impact strength of 27 kg·cm/cm or more, thus having superior impact resistance.

In the present disclosure, a flow index (MI) may be measured under conditions of 220° C. and a load of 10 kg according to ASTM D1238, and yellowness may be measured using a color meter (product name: Color-eye 7000A, manufactured by Gretamacbeth) according to ASTM E313.

Hereinafter, the present disclosure will be described in more detail with reference to the following preferred examples. However, these examples are provided for illustrative purposes only and should not be construed as limiting the scope and spirit of the present disclosure. In addition, it will be apparent to those skilled in the art that various changes and modifications may be made without departing from the spirit and scope of the present disclosure, and such changes and modifications are also within the scope of the appended claims.

EXAMPLE

Example 1

Preparation of ABS Resin Latex 90 parts by weight of ion-exchanged water, 60 parts by weight of polybutadiene rubber latex (having average particle diameter of 3,000 Å), 15 parts by weight of styrene, 7.5 parts by weight of acrylonitrile, 0.1 parts by weight of alkenyl C16-18 succinate potassium salt (ELOPLA AS100) as an emulsifier, 0.3 parts by weight of fatty acid potassium salt, 0.04 parts by weight of tert-butyl hydroperoxide as an initiator, 0.4 parts by weight of tertiary dodecyl mercaptan, 0.05 parts by weight of sodium pyrophosphate, 0.05 parts by weight of dextrose, and 0.001 parts by weight of ferrous sulfate were fed batchwise into a polymerization reactor charged with nitrogen, and polymerization was carried out while elevating temperature to 70° C. over a period of one hour. After polymerization, an emulsion mixture including 10 parts by weight of ion-exchanged water, 15 parts by weight of styrene, 7.5 parts by weight of acrylonitrile, 0.1 parts by weight of alkenyl C16-18 succinate potassium salt (ELOPLA AS100), 1.0 part by weight of fatty acid potassium salt, 0.04 parts by weight of tert-butyl hydroperoxide, 0.05 parts by weight of sodium pyrophosphate, 0.05 parts by weight of dextrose, 0.001 parts by weight of ferrous sulfate, and 0.1 parts by weight of cumene hydroperoxide was continuously added thereto over a period of 60 minutes, and then temperature was elevated to 80° C., followed by aging over a period of one hour and then terminating reaction.

Preparation of ABS Resin Powder 2.0 parts by weight of a 5 wt % aqueous sulfuric acid solution was added to 100 parts by weight of the prepared ABS latex (solid content: 45% by weight, average particle diameter: 3,400 Å), followed by coagulating at 80° C. for 15 minutes and aging at 95° C. for 10 minutes. 1.4 parts by weight of an aqueous 10 wt % sodium hydroxide solution was added to the aged latex, followed by treating with a base (stirring) for 10 minutes. Subsequently, the base-treated aggregate was fed into a centrifugal dehydrator, and water was added thereto in the same amount as the based-treated aggregate, followed by dehydrating for 90 seconds using a centrifugal dehydrator. To a wet powder obtained through the dehydration, water was added in an amount of 10% by weight based on a solid content of the wet powder. Subsequently, 0.4 parts by weight of an aqueous 5% sulfuric acid solution (based on 100 parts by weight of the ABS latex) was added thereto, followed by treating (stirring) with an acid at 200 rpm for 5 minutes. Here, pH was 2. Subsequently, the acid-treated slurry was fed into a centrifugal dehydrator, and water was added thereto in the same amount as the acid-treated aggregate, followed by dehydrating for 90 seconds using a centrifugal dehydrator and washing. Subsequently, drying was performed for 30 minutes using a hot air dryer at 90° C. As a result, an ABS resin powder was obtained.

Examples 2 to 6

An experiment was carried out in the same manner as in Example 1, except that aqueous sulfuric acid solutions were added, in such amounts that the pHs of acid-treated slurries respectively reached 1.8, 3.34, 5.40, 7.68, and 9.12, to the acid-treated slurries.

Comparative Example 1

An experiment was carried out in the same manner as in Example 1, except that a step of treating with a base and a step of treating with an acid were omitted.

Comparative Example 2

An experiment was carried out in the same manner as in Example 1, except that a step of treating with an acid was omitted (pH: 11.10) (see a column indicated as pH 11.10 in the FIGURE.

Test Example

The ABS resin powder prepared according to each of Examples 1 to 6 and Comparative Examples 1 to 2 was melt-extruded to manufacture a specimen. The characteristics of the specimen were measured according to the following methods. Results are shown in Table 1 below and accompanying FIGURE.

Izod impact strength: A specimen was manufactured to a thickness of ¼", and Izod impact strength thereof was measured according to ASTM D256.

Gloss (GU): Measured at 45° according to ASTM D523 using a glossmeter.

Color and whiteness (WI): L, a, and b values and a whiteness index (WI) of a specimen were measured using a colorimeter (Color Quest II, Hunter Lab Co.).

Each of L, a, and b denotes a value on a coordinate axis indicating a unique color. L is 0 to 100. L is black as it approaches 0, and L is white as it approaches 100. a is a positive number (+) or a negative number (−). When a is a positive number (+), it is red and, when a is a negative number (−), it is green. b is a positive number (+) or a negative number (−). When b is a positive number (+), it is yellow, and, when b is a negative number (−), it is blue.

Analysis of residual emulsifier: 0.3 g of the ABS resin powder was dissolved in 10 ml of THF, and then 30 ml of methanol was added thereto, thereby precipitating a polymer. A supernatant was filtered, and ingredients of an emulsifier were analyzed using a liquid chromatography mass spectrometer (LC/MSD).

Measurement of moisture content: Using a moisture analyzer (METTLER/TOLEDO HR83-P), a moisture content in a wet powder obtained after dehydration and a moisture content in the wet powder completely dried at 150° C. were measured to calculate weight change.

Oxidative induction time (OIT): OIT refers to a time taken until oxidization occurs through injection of oxygen at a rate of 50 ml/min under an isothermal condition of 190° C. and was measured using differential scanning calorimetry (DSC). Thermal stability is superior as OIT increases.

Scorch test (scorch resistance): A sample was placed in a 200° C. oven, and a time taken until a carbide from the sample was detected was measured.

Analysis of remaining acid: 100 ml of distilled water was added to a solution prepared by dissolving 10 g of the ABS resin powder in 100 ml of methyl ethyl ketone, followed by stirring. Subsequently, the mixture was separated into an upper layer (MEK+resin) and a lower layer (distilled water+remaining acid), and then the lower layer was separately collected. To 80 ml of the collected lower layer, an aqueous 0.01 M sodium hydroxide solution was added dropwise to analyze remaining acid ingredients.

Weight reduction due to isothermal heating: Referred to as thermogravimetric analysis (TGA). Weight change during heating of a sample at 250° C. for 60 minutes was measured. Weight reduction due to heating was calculated according to Mathematical Equation 1 below:

Weight reduction due to heating (% by weight)={[1−(weight of sample after being allowed to sit at 250° C. for 60 minutes)]/(initial weight of sample)}*100     [Mathematical Equation 1]

Heat distortion temperature (HDT): According to ASTM D648, a heat distortion temperature of a specimen having a thickness of ¼" was measured under a load of 18.6 kg/cm².

TABLE 1

| Classification | Example 1 | Comparative Example 1 | Comparative Example 2 |
|---|---|---|---|
| Coagulant | Sulfuric acid | Sulfuric acid | Sulfuric acid |
| First treatment with base | ○ | X | ○ |
| Second treatment with sulfuric acid | ○ | X | X |
| Impact strength (¼") (kg · cm/cm) | 27.7 | 26.2 | 27.7 |
| Gloss | 99.5 | 98.4 | 101 |
| b value | 3.9 | 8.5 | 3.8 |
| Whiteness (W) | 46.9 | 40.2 | 47.0 |
| Remaining emulsifier (ppm) | 4300 | 16100 | 4300 |
| pH | 2 | 2 | 11 |
| OIT (min) | 17.5 | 17.6 | 9.3 |
| HDT (° C.) | 84.2 | 81.9 | 82.7 |
| Remaining acid (ppm) | 0 | 270 | 0 |
| Weight loss by isothermal heating (% by weight) | 0.59 | 1.46 | 0.35 |

As shown in Table 1, it was confirmed that, in the case of the ABS resin (Example 1) prepared according to the method of the present invention, thermal stability was the same and all of the other properties were superior, compared to the ABS resin of Comparative Example 1 in which treatment with a base and treatment with an acid were omitted. In addition, it was confirmed that, in the case of the ABS resin (Example 1) prepared according to the method of the present invention, all properties were superior and thermal stability was remarkably excellent, compared the ABS resin of Comparative Example 2 in which treatment with an acid was omitted.

In addition, it was confirmed that, referring to a scorch resistance test result illustrated in the FIGURE, pHs of the acid-treated ABS resins (Examples 2 to 6) prepared according to the method of the present invention were 1.86 to 9.12. Superiorly, a pH range thereof was 1.86 to 5.48. Excellently, a pH range thereof was 3 to 4.

Additional Example

Preparation of ABS Resin Composition 27 parts by weight of the ABS resin powder prepared according to Example 1, 73 parts by weight of a styrene-acrylonitrile copolymer, 1.2 parts by weight of a lubricant, and 0.2 parts by weight of an antioxidant were kneaded and extruded (210° C., 250 rpm), thereby preparing a pellet-type ABS resin composition.

The prepared ABS resin composition exhibited a gloss of 98 to 101, a whiteness of 47.5 or more, a yellowness of about 3.8, a flow index of 20 to 30 g/10 min (220° C., under a load of 10 kg), and an impact strength (¼") of 27 kg·cm/cm or more. That is, in the case of the prepared ABS resin composition, surface characteristics, moldability, and mechanical properties were all superior.

The invention claimed is:

1. A method of preparing a thermoplastic resin, the method comprising:
    A) a step of coagulating an emulsion-polymerized latex with an acid to prepare a coagulated aggregate (slurry);
    B) a step of treating the coagulated aggregate (slurry) with a base to prepare a wet powder, followed by dehydration; and
    C) a step of treating the dehydrated wet powder with an acid, followed by dehydration.

2. The method according to claim 1, wherein the emulsion-polymerized latex is a vinyl cyanide compound-conjugated diene-aromatic vinyl compound copolymer latex.

3. The method according to claim 1, wherein in step A), the acid is sulfuric acid.

4. The method according to claim 1, wherein, in the step of treating the coagulated aggregate (slurry) with a base, the base is added to and then mixed with the coagulated aggregate.

5. The method according to claim 1, wherein the base is sodium hydroxide.

6. The method according to claim 1, further comprising, between steps A) and B), a step of aging the coagulated aggregate (slurry).

7. The method according to claim 6, wherein, in the step of the aging, the aggregate is aged at 85 to 95° C. for 2 to 20 minutes.

8. The method according to claim 1, wherein, in step C) of treating the dehydrated wet powder with an acid, water and an acid, water and an aqueous acid solution, or an aqueous acid solution is added and then mixed.

9. The method according to claim 1, wherein the wet powder, which is acid-treated and then dehydrated according to step C), has a pH of 3 to 9.

10. The method according to claim 1, wherein a residual emulsifier in the wet powder, which is acid-treated and then dehydrated according to step C), is present in a concentration of 7,000 ppm or less.

11. The method according to claim 1, wherein the wet powder, which is acid-treated and then dehydrated according to step C), has an oxidative induction time (OIT) of 15 minutes or more at a temperature of 190° C. and an oxygen flow of 50 ml/min.

12. The method according to claim 1, wherein the thermoplastic resin has a gloss of 98 or more, as measured at 45° according to ASTM D523 using a glossmeter.

13. The method according to claim 1, wherein the thermoplastic resin has a whiteness (WI) of 45 or more, as measured using a Color Quest II colorimeter by Hunter Lab Co.

14. The method according to claim 1, wherein the thermoplastic resin has a b value of 5 or less, as measured using a Color Quest II colorimeter by Hunter Lab Co.

15. The method according to claim 1, wherein the thermoplastic resin has an impact strength (¼") of 27 kg·cm/cm or more, as measured according to ASTM D256.

16. The method according to claim 1, wherein the thermoplastic resin has a scorch time of 40 minutes or more as a time taken until a carbide from a sample is detected in a 200° C. oven.

* * * * *